(12) United States Patent
Saito et al.

(10) Patent No.: US 8,847,454 B2
(45) Date of Patent: Sep. 30, 2014

(54) ROTATING ELECTRIC MACHINE AND AUTOMOBILE

(75) Inventors: Yasuyuki Saito, Hitachinaka (JP); Noriaki Hino, Mito (JP); Tomoaki Kaimori, Hitachinaka (JP); Shinji Sugimoto, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 47 days.

(21) Appl. No.: 13/504,283

(22) PCT Filed: Aug. 24, 2010

(86) PCT No.: PCT/JP2010/064277
§ 371 (c)(1),
(2), (4) Date: Jun. 25, 2012

(87) PCT Pub. No.: WO2011/055582
PCT Pub. Date: May 12, 2011

(65) Prior Publication Data
US 2012/0274169 A1 Nov. 1, 2012

(30) Foreign Application Priority Data

Nov. 6, 2009 (JP) .................................. 2009-254539

(51) Int. Cl.
*H02K 1/27* (2006.01)
(52) U.S. Cl.
CPC ............. *H02K 1/276* (2013.01); *Y02T 10/641* (2013.01)
USPC ............. 310/156.57; 310/156.53; 310/156.56
(58) Field of Classification Search
CPC ... H02K 1/276; H02K 1/2766; H02K 1/2773; H02K 1/278

USPC ........................... 310/156.53, 156.56, 156.57
See application file for complete search history.

(56) References Cited

U.S. PATENT DOCUMENTS 6,008,559 A * 12/1999 Asano et al. ............. 310/156.53
6,342,745 B1 * 1/2002 Sakai et al. ............. 310/156.56
(Continued)

FOREIGN PATENT DOCUMENTS

JP 3308828 B2 5/2002
JP 2004-236471 A 8/2004
(Continued)

OTHER PUBLICATIONS

Corresponding International Search Report with English Translation dated Nov. 30, 2010 (four (4) pages).

*Primary Examiner* — Terrance Kenerly
(74) *Attorney, Agent, or Firm* — Crowell & Moring LLP

(57) ABSTRACT

A rotating electric machine includes a stator and a rotor. Each of magnetic poles of the rotor includes a magnet insertion hole, a permanent magnet that is inserted in the magnet insertion hole, and a nonmagnetic portion formed between the permanent magnet and an auxiliary salient pole. A portion of the rotor core located toward the stator relative to the nonmagnetic portion function as a bridge portion connecting a magnetic pole peace with the auxiliary salient pole. A side of the nonmagnetic portion located toward the stator includes a first side at the bridge portion, extending along a virtual circular arc passing through the permanent magnet insertion hole closest to the stator, and a side of the nonmagnetic portion located toward the auxiliary salient pole includes a second side extending away from the stator, with the first side and the second side connected through a curved line.

10 Claims, 15 Drawing Sheets

(56) References Cited

U.S. PATENT DOCUMENTS

Figure 1:
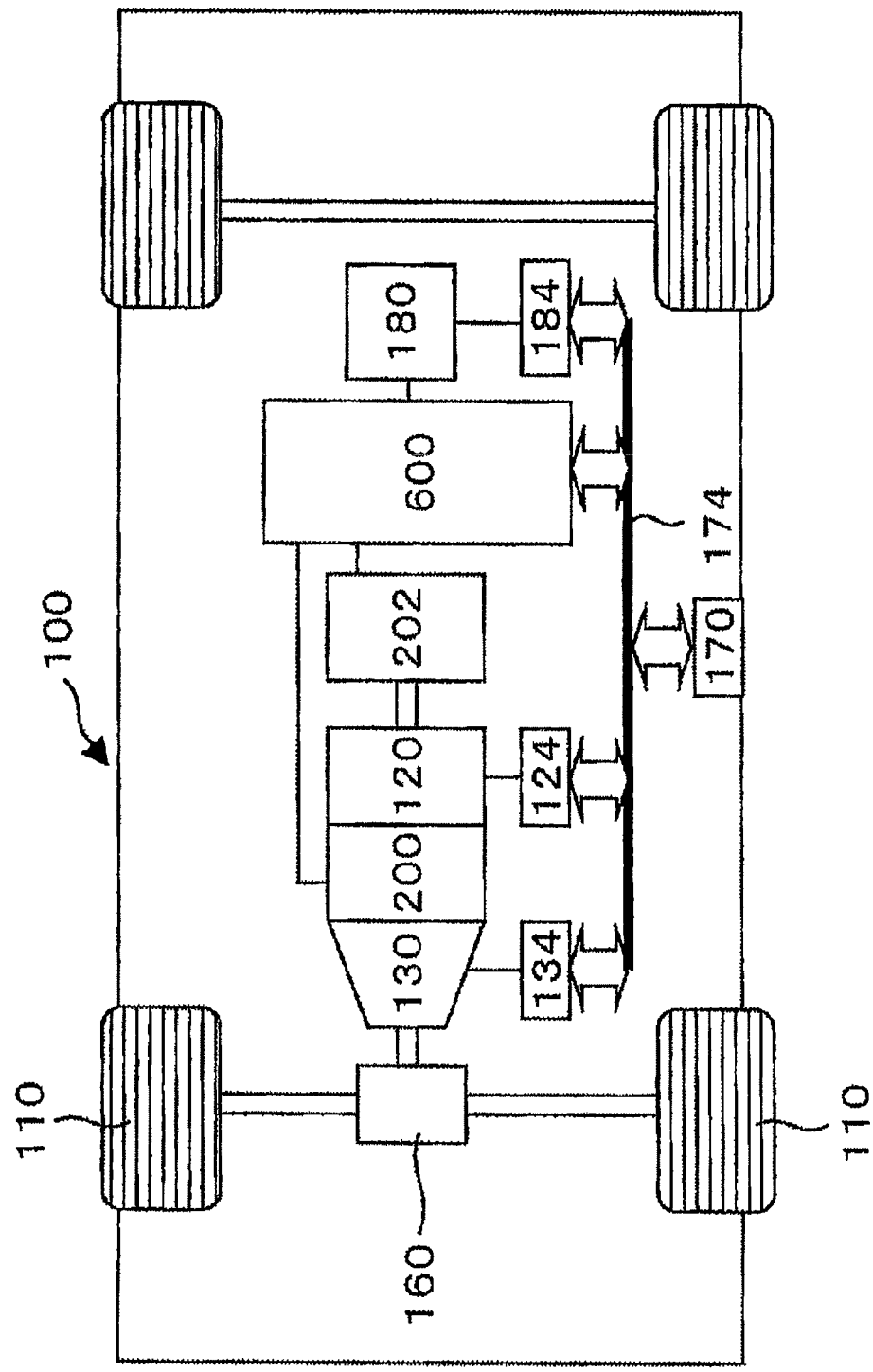

| | | | |
|---|---|---|---|
| 2002/0171309 A1* | 11/2002 | Wakui et al. | 310/156.48 |
| 2003/0080642 A1* | 5/2003 | Mori et al. | 310/156.57 |
| 2004/0007930 A1 | 1/2004 | Asai et al. | |
| 2005/0040723 A1 | 2/2005 | Asai et al. | |
| 2006/0113858 A1* | 6/2006 | Hino et al. | 310/156.53 |
| 2008/0007131 A1* | 1/2008 | Cai et al. | 310/156.38 |
| 2009/0152972 A1* | 6/2009 | Nishijima | 310/156.57 |
| 2009/0224627 A1 | 9/2009 | Hino et al. | |
| 2009/0230802 A1* | 9/2009 | Kamiya et al. | 310/156.53 |

FOREIGN PATENT DOCUMENTS

| | | |
|---|---|---|
| JP | 2006-187189 A | 7/2006 |
| JP | 2009-213256 A | 9/2009 |

\* cited by examiner

ROTATING ELECTRIC MACHINE AND AUTOMOBILE

TECHNICAL FIELD

The present invention relates to a rotating electric machine and an automobile with the rotating electric machine installed therein.

BACKGROUND ART

An embedded permanent magnet rotating electric machine with auxiliary salient poles, which can be engaged in a high-speed rotation under weak field control and also allows active utilization of reluctance torque, is often used to drive a vehicle in the related art. For instance, patent literature 1 (Japanese Patent Gazette No. 3308828) discloses a structure adopted in an embedded permanent magnet rotating electric machine to assure both high output and a lesser extent of torque rippling by forming a gap at the rotor where permanent magnets are disposed.

Patent literature 2 (Japanese Laid Open Patent Publication No. 2006-187189) discloses a structure adopted in an embedded magnet rotating electric machine that mechanically allows the rotating electric machine to rotate at high speed.

CITATION LIST

Patent Literature

Patent literature 1: Japanese Gazette Patent No. 3308828
Patent literature 2: Japanese Laid Open Patent Publication No. 2006-187189

SUMMARY OF THE INVENTION

Technical Problem

A permanent magnet rotating electric machine used to drive a vehicle is required to generate a very large torque relative to its size. The torque output by a rotating electric machine can be increased by applying greater electric current through the stator coil. However, as a greater current flows through the stator coil, more heat is generated, which is bound to impose some thermal restrictions with regard to the current density. This means that effective utilization of magnetic fluxes imparted by the permanent magnets is critical in enabling a permanent magnet rotating electric machine used for vehicle drive to output maximum torque.

The effective magnetic flux imparted by a permanent magnet embedded in a permanent magnet rotating electric machine may be increased by reducing the depth at which the permanent magnet is embedded and thus reducing the extent of magnetic flux leakage. However, in order to allow the permanent magnet to be embedded at a lesser depth, the embedded permanent magnet rotating electric machine in vehicle drive applications, which needs to operate at high rotation speed, must adopt a structure capable of withstanding the stress of high-speed rotation, achieved by improving the centrifugal force-withstanding mechanical strength.

Solution to Problem

According to the 1st aspect of the present invention, a rotating electric machine comprises: a stator that includes a stator core and a stator winding wound at the stator core; and a rotor that is rotatably supported so as to rotate freely relative to the stator and includes a rotor core, with a plurality of magnetic poles formed at the rotor core and auxiliary salient poles formed for reluctance torque generation each between two successive magnetic poles set next to each other, wherein: each of the magnetic poles of the rotor comprises a magnet insertion hole formed at the rotor core, a permanent magnet that is inserted in the magnet insertion hole, and a nonmagnetic portion formed between the permanent magnet and an auxiliary salient pole; the permanent magnet is magnetized so as to achieve one polarity of N polarity and S polarity on a stator side thereof and achieve the other polarity on the opposite side wherein a magnetizing direction is reversed at every magnetic pole formed along a circumferential direction of the rotor; at the rotor, a portion of the rotor core present over an area located toward the stator relative to the permanent magnet functions as a magnetic pole peace and a portion of the rotor core present over an area located toward the stator relative to the nonmagnetic portion function as a bridge portion connecting the magnetic pole peace with the auxiliary salient pole; and a side of the nonmagnetic portion located toward the stator includes a first side at the bridge portion, extending from a side where the permanent magnet is present toward an auxiliary salient pole along a virtual circular arc centered on a rotational axis of the rotor and passing through the permanent magnet insertion hole at a position closest to the stator, and a side of the nonmagnetic portion located toward the auxiliary salient pole includes a second side extending further away from the stator, with the first side and the second side connected through a curved line.

According to the 2nd aspect of the present invention, in the rotating electric machine according to the 1st aspect, it is preferred that the second side of the nonmagnetic portion extends substantially along a q-axis magnetic flux passing through the auxiliary salient pole.

According to the 3rd aspect of the present invention, in the rotating electric machine according to the 1st aspect, it is preferred that a ratio of a length of the curved line to a length of the first side is within a range of 0.5 to 2.

According to the 4th aspect of the present invention, in the rotating electric machine according to the 1st aspect, it is preferred that the nonmagnetic portion includes a third side, located at a surface thereof toward the stator and formed between the first side and the curved line so as to connect the first side and the curved line with a substantially straight line.

According to the 5th aspect of the present invention, in the rotating electric machine according to the 1st aspect, it is preferred that a thickness of the nonmagnetic portions measured along a radial direction is smaller than a thickness of the magnet measured along the radial direction.

According to the 6th aspect of the present invention, in the rotating electric machine according to the 1st aspect, it is preferred that a plurality of magnets are inserted in the magnet insertion hole.

According to the 7th aspect of the present invention, in the rotating electric machine according to the 6th aspect, it is preferred that at least one nonmagnetic portion is formed between the plurality of magnets.

According to the 8th aspect of the present invention, in the rotating electric machine according to the 1st aspect, it is preferred that: the stator winding is wound with a distributed winding method; and a pole arc rate at the magnet is set within a range of 0.50±0.05 and a pole arc rate at the nonmagnetic portion is set within a range of 0.70±0.05.

According to the 9th aspect of the present invention, in the rotating electric machine according to the 1st aspect, it is preferred that: the stator winding is wound with a concentrated winding method; and a pole arc rate at the magnet is set within a range of 0.66±0.05 and a pole arc rate at the non-magnetic portions is set within a range of 0.80±0.05.

According to the 10th aspect of the present invention, an automobile comprises: a rotating electric machine according to the 1; a battery that provides DC power; and a conversion device that converts the DC power from the battery to AC power and supplies the AC power to the rotating electric machine, wherein torque generated at the rotating electric machine is used as a drive force.

Advantageous Effect of the Invention

According to the present invention, the extent to which stress induced by centrifugal force concentrates at the rotor core can be lessened.

BRIEF DESCRIPTION OF THE DRAWINGS (FIG. 1) A schematic illustration of the structure of a hybrid electric vehicle equipped with the rotating electric machine achieved in an embodiment (FIG. 2) A circuit diagram pertaining to the power conversion device 600

(FIG. 3) A sectional view of a rotating electric machine achieved in the embodiment (FIG. 4) A sectional view of the stator 230 and the rotor 250 achieved in the embodiment (FIG. 5) An illustration showing how a reluctance torque is generated (FIG. 6) An enlarged view of an area around a permanent magnet 254 in the embodiment (FIG. 7) An enlarged view of an area around a bridge portion 258 in the embodiment (FIG. 8) An illustration indicating the direction of tensile stress in the area around a bridge portion 258 in the embodiment (FIG. 9) An illustration indicating the direction of tensile stress in the area around a bridge portion 258 in a comparable example provided for reference (FIG. 10) An illustration indicating the direction of tensile stress in the area around a bridge portion 258 in a comparable example provided for reference (FIG. 11) An illustration showing how magnetic flux lines are distributed in a power-off state in the embodiment (FIG. 12) An illustration showing how magnetic flux lines are distributed in a power-off state in a comparable example provided for reference (FIG. 13) An illustration showing how magnetic flux lines are distributed in a power-on state in the embodiment (FIG. 14) An illustration showing how magnetic flux lines are distributed in a power-on state in a comparable example provided for reference (FIG. 15) A sectional view of the stator 230 and the rotor 250 achieved in an embodiment, included in a rotating electric machine with a groove 330 formed on the outer side of an auxiliary salient pole portion 259

(FIG. 16) A sectional view of the stator 230 and the rotor 250 achieved in an embodiment, included in a rotating electric machine with a plurality of permanent magnets 254 used in correspondence to each pole (FIG. 17) A sectional view of the stator 230 and the rotor 250 achieved in an embodiment, included in a rotating electric machine adopting a concentrated winding method

DESCRIPTION OF PREFERRED EMBODIMENTS

The following is a description of embodiments of the present invention, given in reference to the drawings.

The rotating electric machine according to the present invention assures both higher torque and higher rotation speed, as detailed below. For this reason, it is ideal in applications in which it is used as a traveling motor for an electric vehicle. While the rotating electric machine according to the present invention may be adopted in a pure electric vehicle engaged in traveling operation exclusively on a rotating electric machine or in a hybrid type electric vehicle driven both by an engine and a rotating electric machine, the following description is given by assuming that the present invention is adopted in a hybrid type electric vehicle.

FIG. 1 is a schematic illustration showing the structure of a hybrid type electric vehicle having installed therein rotating electric machines achieved in an embodiment. An engine 120, a first rotating electric machine 200, a second rotating electric machine 202 and a battery 180 are mounted at a vehicle 100. The battery 180 provides DC power to the rotating electric machines 200 and 202 when drive forces imparted by the rotating electric machines 200 and 202 are required, whereas it receives DC power from the rotating electric machines 200 and 202 during a regenerative traveling operation. The battery 180 and the rotating electric machines 200 and 202 exchange DC power via a power conversion device 600. In addition, although not shown, a battery that provides low voltage power (e.g., 14 V power) is installed in the vehicle so as to supply DC power to the control circuits to be described below.

Rotational torque generated via the engine 120 and the rotating electric machines 200 and 202 is transmitted to front wheels 110 via a transmission 130 and a differential gear unit 160. The transmission 130 is controlled by a transmission control device 134, whereas the engine 120 is controlled by an engine control device 124. The battery 180 is controlled by a battery control device 184. The transmission control device 134, the engine control device 124, the battery control device 184, the power conversion device 600 and an integrated control device 170 are connected with one another via a communication line 174.

The integrated control device 170 receives, via the communication line 174, information originating from lower order control devices relative to the integrated control device 170, i.e., the transmission control device 134, the engine control device 124, the power conversion device 600 and the battery control device 184, which indicates the statuses at the individual lower order control devices. Based upon the information thus received, the integrated control device 170 generates through arithmetic operation a control command for each corresponding control device and the control command generated through the arithmetic operation is then transmitted to the particular control device via the communication line 174.

The high-voltage battery 180, constituted with secondary battery cells such as lithium ion battery cells or nickel hydride battery cells, is capable of outputting high-voltage DC power in a range of 250 to 600 v or higher. The battery control device 184 outputs, via the communication line 174, information indicating the state of discharge in the battery 180 and the states of the individual battery cell units constituting the battery 180 to the integrated control device 170.

Upon judging, based upon the information provided by the battery control device 184, that the battery 180 needs to be charged, the integrated control device 170 issues a power generation operation instruction for the power conversion device 600. The primary functions of the integrated control device 170 further include management of torque output from the engine 120 and the rotating electric machines 200 and 202, arithmetic processing executed to calculate the overall torque representing the sum of the torque output from the engine 120 and the torques output from the rotating electric machines 200 and 202, and a torque distribution ratio, and transmission of control commands generated based upon the arithmetic processing results to the transmission control device 134, the engine control device 124 and the power conversion device 600. Based upon a torque command issued by the integrated control device 170, the power conversion device 600 controls the rotating electric machines 200 and 202 so as to output torque or generate power as indicated in the command.

The power conversion device 600 includes power semiconductors that constitute inverters via which the rotating electric machines 200 and 202 are engaged in operation. The power conversion device 600 controls switching operation of the power semiconductors based upon a command issued by the integrated control device 170. As the power semiconductors are engaged in the switching operation as described above, the rotating electric machines 200 and 202 are each driven operate as an electric motor or a power generator.

When engaging the rotating electric machines 200 and 202 in operation as electric motors, DC power provided from the high-voltage battery 180 is supplied to DC terminals of the inverters in the power conversion device 600. The power conversion device 600 controls the switching operation of the power semiconductors so as to convert the DC power supplied to the inverters to three-phase AC power and provide the three-phase AC power to the rotating electric machines 200 and 202. When engaging the rotating electric machines 200 and 202 in operation as generators, the rotors of the rotating electric machines 200 and 202 are rotationally driven with a rotational torque applied thereto from the outside and thus, three-phase AC power is generated at the stator windings of the rotating electric machines 200 and 202. The three-phase AC power thus generated is converted to DC power in the power conversion device 600 and the high-voltage battery 180 is charged with the DC power supplied thereto.

Figure 2:
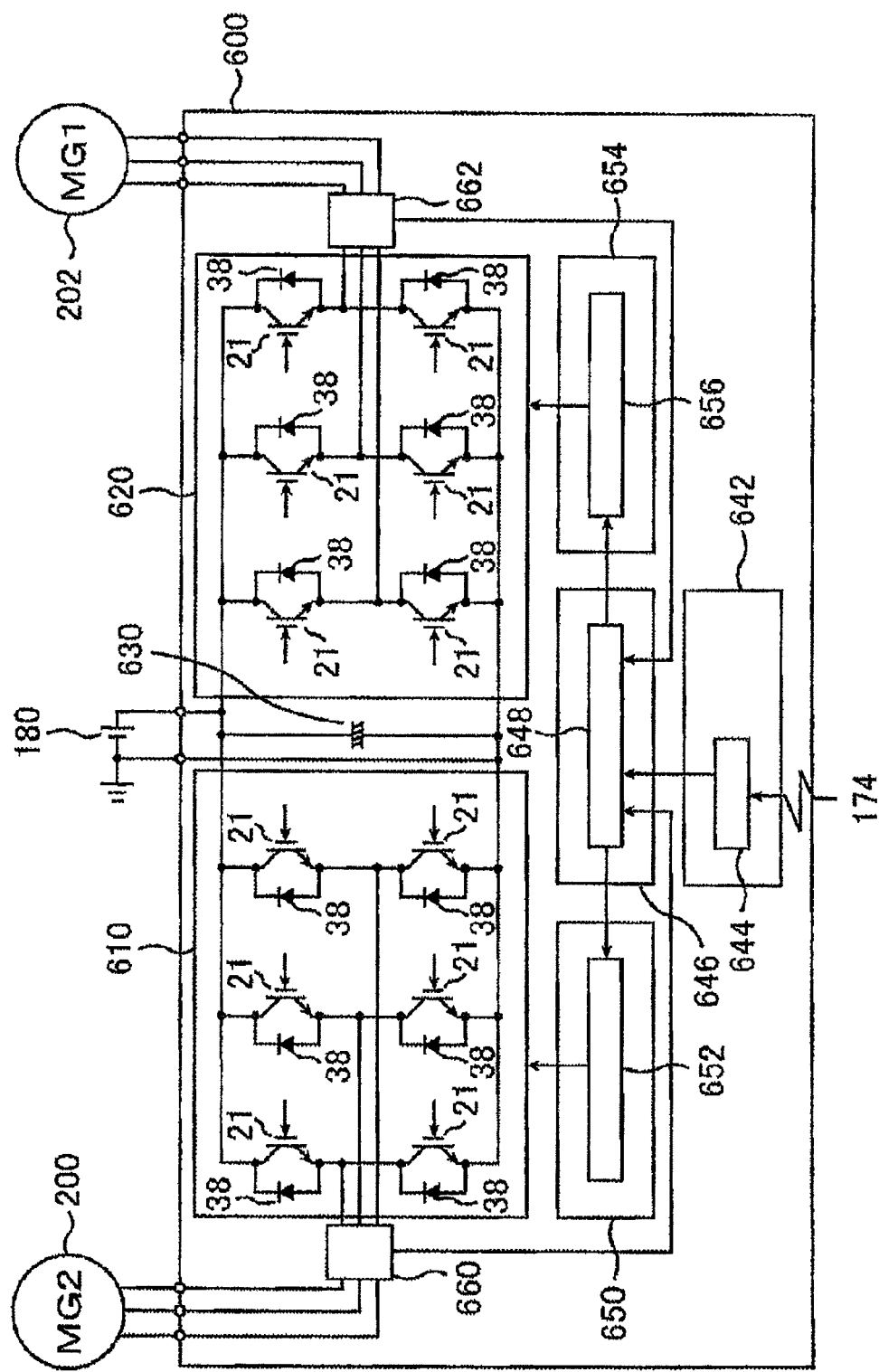

FIG. 2 is a circuit diagram pertaining to the power conversion device 600 shown in FIG. 1. The power conversion device 600 includes a first inverter device for the rotating electric machine 200 and a second inverter device for the rotating electric machine 202. The first inverter device comprises a power module 610, a first drive circuit 652 that controls switching operation of power semiconductors 21 in the power module 610 and a current sensor 660 that detects an electric current at the rotating electric machine 200. The drive circuit 652 is disposed at a drive circuit substrate 650. The second inverter device comprises a power module 620, a second drive circuit 656 that controls switching operation of power semiconductors 21 in the power module 620 and a current sensor 662 that detects an electric current at the rotating electric machine 202. The drive circuit 656 is disposed at a drive circuit substrate 654. A control circuit 648 disposed at a control circuit substrate 646, a capacitor module 630 and a transmission/reception circuit 644 mounted at a connector substrate 642 are all shared by the first inverter device and the second inverter device.

The power modules 610 and 620 are engaged in operation with drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating electric machine 200 or 202. In addition, the power modules 610 and 620 convert AC power induced at the stator windings of the rotating electric machines 200 and 202 to DC power and provide the DC power resulting from the conversion to the high-voltage battery 180.

As indicated in FIG. 2, the power modules 610 and 620 each include a three-phase bridge circuit constituted with serial circuits each corresponding to one of the three phases, electrically connected in parallel between the positive pole side and the negative pole side of the battery 180. Each serial circuit includes a power semiconductor 21 constituting an upper arm and a power semiconductor 21 constituting a lower arm, connected in series. Since the power module 610 and the power module 620 adopt circuit structures substantially identical to each other, as shown in FIG. 2, the following description focuses on the power module 610 chosen as a representative example.

The switching power semiconductor elements used in the embodiment are IGBTs (insulated gate bipolar transistors) 21. An IGBT 21 includes three electrodes; a collector electrode, an emitter electrode and a gate electrode. A diode 38 is electrically connected between the collector electrode and the emitter electrode of the IGBT 21. The diode 38 includes two electrodes; a cathode electrode and an anode electrode, with the cathode electrode electrically connected to the collector electrode of the IGBT 21 and the anode electrode electrically connected to the emitter electrode of the IGBT 21 so as to define the direction running from the emitter electrode toward the collector electrode at the IGBT 21 as a forward direction.

It is to be noted that MOSFETs (metal oxide semiconductor field effect transistors) may be used as the switching power semiconductor elements, instead. A MOSFET includes three electrodes; a drain electrode, a source electrode and a gate electrode. The MOSFET does not require diodes 38 such as those shown in FIG. 2, since it includes a parasitic diode with which the direction running from the drain electrode toward the source electrode is defined as the forward direction, present between the source electrode and the drain electrode.

The upper and lower arms in the serial circuit corresponding to a given phase are configured by electrically connecting the emitter electrode of one IGBT 21 and the collector electrode of another IGBT 21 in series. It is to be noted that while the figure shows the upper arm and the lower arm corresponding to a given phase each constituted with a single IGBT, a large current control capacity needs to be assured in the embodiment and thus, a plurality of IGBTs are connected in parallel to constitute an upper arm or a lower arm. However, for purposes of simplification, the following explanation is given by assuming that each arm is constituted with a single power semiconductor.

In the embodiment described in reference to FIG. 2, each upper arm or lower arm, corresponding to one of the three phases, is actually configured with three IGBTs. The collector electrode of the IGBT 21 constituting the upper arm in a given phase is electrically connected to the positive pole side of the battery 180, whereas the source electrode of the IGBT 21 constituting the lower arm in a given phase is electrically connected to the negative pole side of the battery 180. A middle point between the arms corresponding to each phase (an area where the emitter electrode of the upper arm-side IGBT and the collector electrode of the lower arm-side IGBT are connected) is electrically connected to the armature winding (stator winding) of the corresponding phase at the corresponding rotating electric machine 200 or 202.

The drive circuits 652 and 656, constituting drive units via which the corresponding inverter devices 610 and 620 are controlled, generate drive signals used to drive the IGBTs 21 based upon a control signal output from the control circuit 648. The drive signals generated at the individual drive circuits 652 and 656 are respectively output to the gates of the various power semiconductor elements in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter device 610 and 620, is constituted with a microcomputer that generates, through arithmetic operation, a control signal (control value) based upon which the plurality of switching power semiconductor elements are engaged in operation (turned on/off). A torque command signal (a torque command value) provided from a higher-order control device, sensor outputs from the current sensors 660 and 662, and sensor outputs from rotation sensors mounted at the rotating electric machines 200 and 202 are input to the control circuit 648. Based upon these signals input thereto, the control circuit 648 calculates control values and outputs control signals to the drive circuits 652 and 656 to be used to control the switching timing.

The transmission/reception circuit 644 mounted at the connector substrate 642, which electrically connects the power conversion device 600 with an external control device, is engaged in information exchange with another device via the communication line 174 shown in FIG. 1. The capacitor module 630, constituting a smoothing circuit via which the extent of DC voltage fluctuation occurring as the IGBTs 21 are engaged in switching operation is reduced, is electrically connected in parallel with DC-side terminals of the first power module 610 and the second power module 620.

Figure 3:
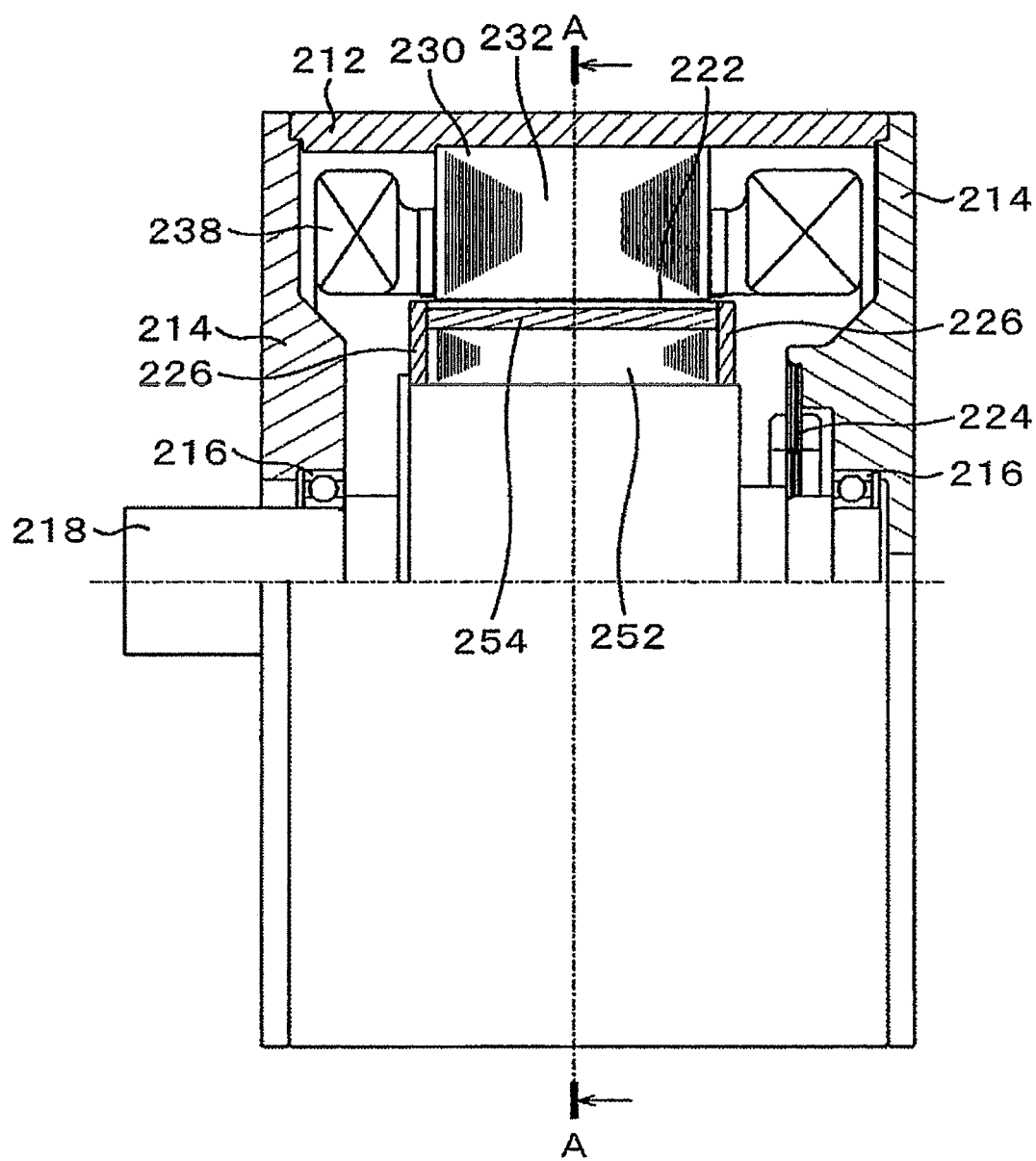

FIG. 3 is a sectional view of the rotating electric machine 200 or the rotating electric machine 202 in FIG. 1. Since the structure of the rotating electric machine 200 is substantially identical to that of the rotating electric machine 202, the following description focuses on the structure adopted in the rotating electric machine 200, as a representative example. It is to be noted, however, that the structural features described below do not need to be adopted in both rotating electric machines 200 and 202, as long as they are adopted in either one of them.

A stator 230, held inside a housing 212, includes a stator core 232 and a stator winding 238. Inside the stator core 232, a rotor 250 is rotatably held over an air gap 222. The rotor 250 includes a rotor core 252, permanent magnets 254 and nonmagnetic contact plates 226. The rotor core 252 is locked to a shaft 218. The housing 212 includes a pair of end brackets 214 at each of which a bearing 216 is disposed. The shaft 218 is rotatably held via the bearings 216.

As shown in FIG. 3, a resolver 224, which detects the positions of the poles at the rotor 250 and the rotation speed of the rotor 250, is disposed at the shaft 218. An output from the resolver 224 is taken into the control circuit 648 shown in FIG. 2. The control circuit 248 outputs a control signal, generated based upon the output having been taken in, to a drive circuit 653. The drive circuit 653, in turn, outputs a drive signal generated based upon the control signal, to the power module 610. At the power module 610, a switching operation is executed based upon the control signal so as to convert DC power, provided from the battery 180, to three-phase AC power. This three-phase AC power is provided to the stator winding 238 shown in FIG. 3 and, as a result, a rotating magnetic field is generated at the stator 230. The frequency of the three-phase AC current is controlled based upon a detection value provided by the resolver 224 and the phases of the three-phase AC currents relative to the rotor 250, are also controlled based upon a detection value provided by the resolver 224.

Figure 4:
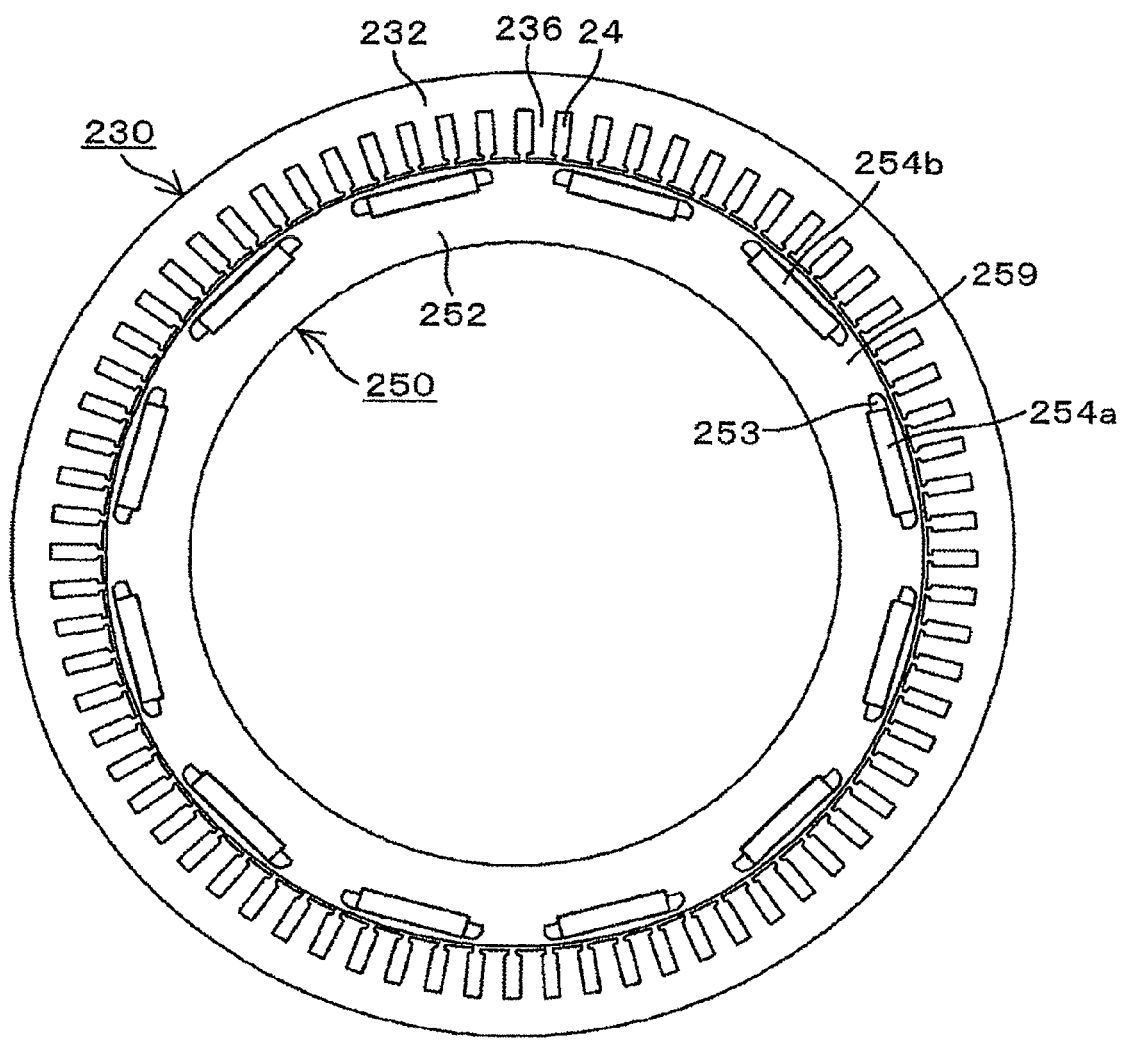

FIG. 4 shows the stator 230 and the rotor 250 in a sectional view taken through A-A in FIG. 3. It is to be noted that FIG. 4 does not include an illustration of the housing 212, the shaft 218 and the stator winding 238.

Numerous slots 24 and teeth 236 are formed in a uniform pattern along the entire inner circumference of the stator core 232. It is to be noted that reference numerals are appended to only one representative slot and an adjacent tooth in FIG. 5. Inside the slots 24, a slot insulator (not shown) is disposed and a plurality of phase windings corresponding to a U-phase, a V-phase and a W-phase, constituting the stator winding 238, are installed in the slots 24. The stator winding 238 in the embodiment is wound by adopting a distributed winding method.

In the distributed winding method, phase windings are wound at the stator core 232 so that each phase winding is housed in two slots set apart from each other with a plurality of slots 24 present between them. The magnetic flux distribution achieved in conjunction with the distributed winding system adopted in the embodiment closely approximates a sine wave form. This means that reluctance torque can be generated readily in the embodiment. Thus, optimal control is enabled over a wide rotation rate range, from a low rotation speed through a high rotation speed, through weak field control and utilization of the reluctance torque, which, in turn, allows optimal motor characteristics for an electric vehicle or the like to be achieved.

In addition, magnet insertion holes 253 at which rectangular magnets are inserted are formed at the rotor core 252. A permanent magnet 254, embedded in each magnet insertion hole 253, is fixed in the magnet insertion hole 253 with an adhesive or the like. The magnet insertion holes 253 are formed so as to achieve a greater width, measured along the circumferential direction, compared to the width of the permanent magnets 254 measured along the circumferential direction and thus, magnetic gaps 257 are formed on the two sides of each permanent magnet 254. These magnetic gaps 257 may be filled with an adhesive or they may be sealed together with the permanent magnets 254 by using a forming resin. The permanent magnets 254 function as field poles of the rotor 250. It is to be noted that the magnetic gaps may be otherwise referred to as nonmagnetic portions.

The permanent magnets 254 are magnetized along the radial direction, and the magnetizing direction is reversed from one field pole to the next. Namely, assuming that the surface of a permanent magnet 254a facing toward the stator and the surface of the permanent magnet 254a located on the axial side respectively achieve N polarity and S polarity, the stator-side surface and the axial-side surface of a permanent magnet 254b disposed next to the permanent magnet 254a respectively achieve S polarity and N polarity. Such permanent magnets 254a and 254b are disposed in an alternate pattern along the circumferential direction. In the embodiment, twelve permanent magnets 254 are disposed over equal intervals and thus, twelve poles are formed at the rotor 250.

The permanent magnets 254 may first be magnetized and then embedded in the rotor core 252, or they may be inserted at the rotor core 252 in an unmagnetized state and then magnetized by applying an intense magnetic field to the inserted permanent magnets. Once magnetized, the permanent magnets 254 exert a strong magnetic force. This means that if the permanent magnets 254 are polarized before they are fitted at the rotor 250, the strong attracting force occurring between the permanent magnets 254 and the rotor core 252 is likely to present a hindrance during the permanent magnet installation process. Furthermore, the strong attracting force may cause foreign matter such as iron dust to settle on the permanent magnets 254. For this reason, better rotating electric machine productivity is assured by magnetizing the permanent magnets 254 after they are inserted at the rotor core 252.

The permanent magnets 254 may be neodymium-based or samarium-based sintered magnets or ferrite magnets, or neodymium-based bonded magnets. The residual magnetic flux density of the permanent magnets 254 is approximately 0.4 to 1.3 T.

The rotating magnetic field induced at the stator 230 by the three-phase AC currents acts on the permanent magnets 254a and 254b in the rotor 250, thereby generating magnetic torque. The rotor 250 is also subjected to a reluctance torque in addition to the magnetic torque.

Figure 5:
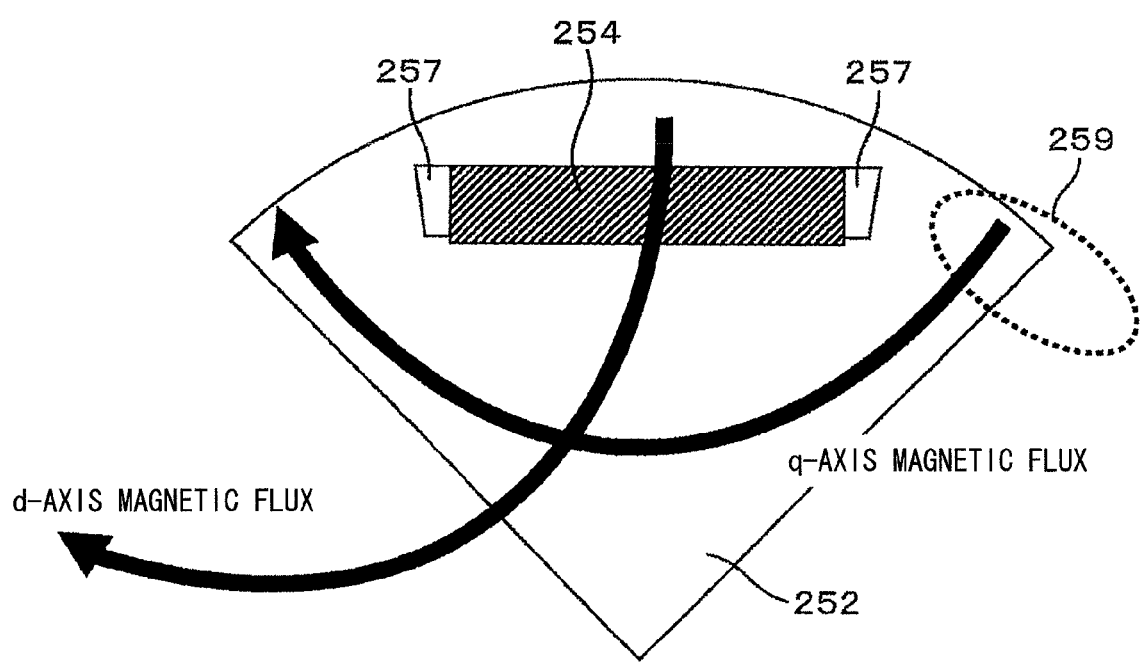

FIG. 5 illustrates how the reluctance torque is generated. An axis along which a magnetic flux passes through the center of a magnet and an axis along which a magnetic flux flows from an area between poles located on one side of the magnet, toward another area between poles on the opposite side are normally referred to as a d-axis and a q-axis respectively. The portion of the core located between two successive magnetic poles is referred to as an auxiliary salient pole portion 259. Since the magnetic permeability of the permanent magnets 254 disposed in the rotor 250 is substantially equal to that of air, the d-axis area viewed from the stator side is magnetically indented, whereas the q-axis area viewed from the stator side is magnetically protruded. For this reason, the core portion present in the q-axis area is referred to as a salient pole. A reluctance torque occurs due to the difference between the degrees of ease with which the magnetic fluxes pass along the d-axis and the q-axis, i.e., a salient pole ratio. In other words, reluctance torque is generated between two successive magnetic poles via the auxiliary salient pole portion 259.

Figure 6:
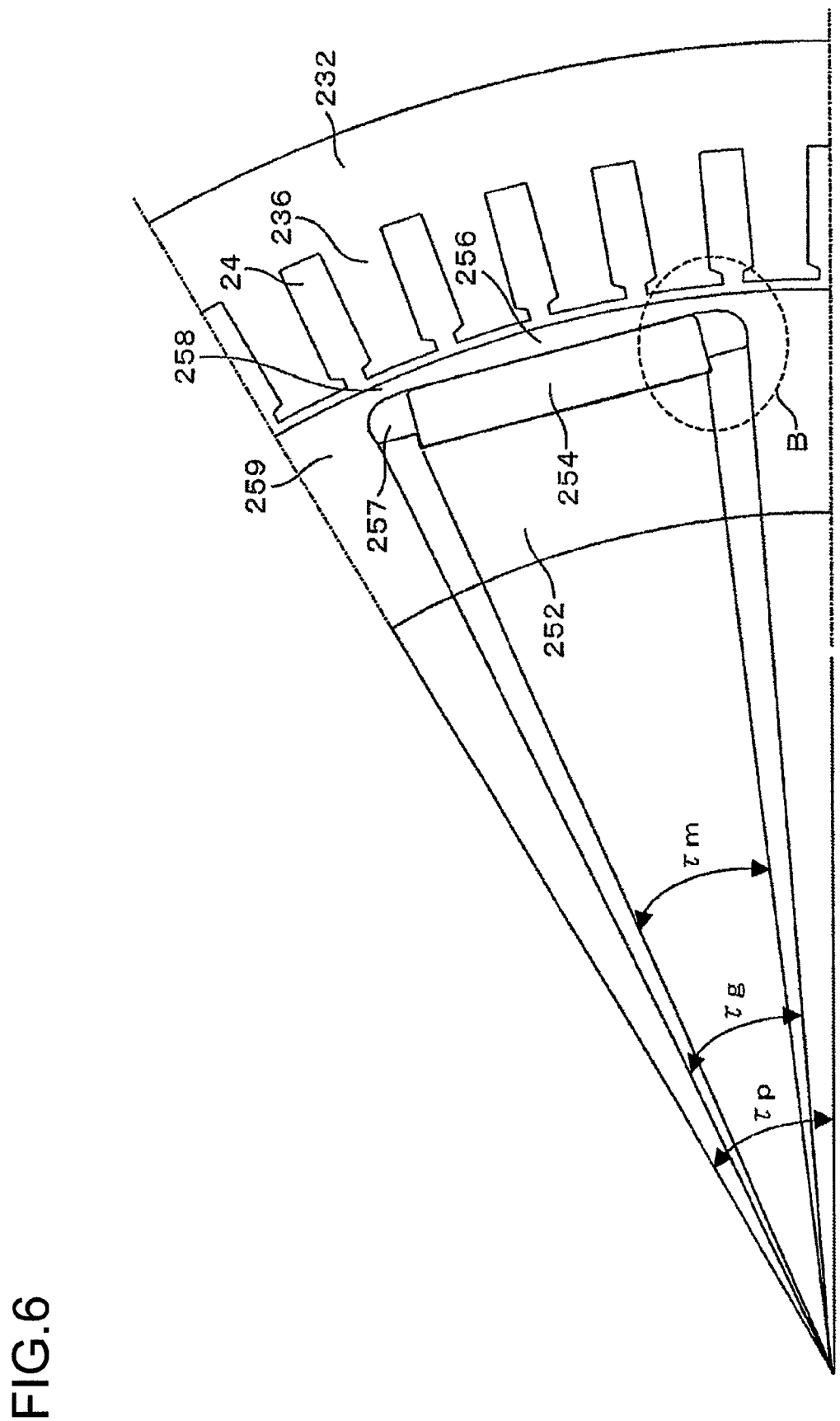

FIG. 6 is an enlarged view of one of the poles in the sectional view in FIG. 4. The magnetic gaps 257 formed on the two sides of each permanent magnet 254 in the rotor core 252 help reduce the extent of cogging torque and the torque pulsations occurring as power is supplied. The thickness of the magnetic gaps 254, measured along the radial direction, is smaller than the thickness of the permanent magnet 254 measured along the radial direction, so as to restrict movement of the permanent magnet 254 along the circumference of the rotor 250 and thus assure ease of assembly without requiring any additional component. In addition, a core portion 256 present between the magnet insertion hole 253 at which the permanent magnet 254 is inserted and the outer circumference of the rotor core 252 is formed so as to assume a smallest thickness along the radial direction over the bridge portions 258.

At the rotor 250, part of the rotor core 252 located further toward the stator 230 relative to the permanent magnet 254 functions as a magnetic pole piece (area) and portions of the rotor core 252 located further toward the stator 230 relative to the magnetic gaps 257 function as bridge portions each connecting the magnetic pole piece (area) with an auxiliary salient pole.

τp represents the pole pitch assumed in conjunction with the permanent magnet 254, τm represents the angle representing the width of the permanent magnet 254 and τg represents the angular width accounting for the permanent magnet and the magnetic gaps 257 formed on the two sides of the permanent magnet 254. The cogging torque can be reduced by adjusting the angular ratio τm/τp and the extent of torque rippling can be reduced by adjusting τg/τp. In the following description, τm/τp will be referred to as a magnetic pole arc rate and τg/τp will be referred to as a gap pole arc rate.

At the stator 230 adopting the distributed winding method, the cogging torque can be reduced particularly effectively by setting the magnetic pole arc rate within a range of 0.50±0.05. In addition, by setting the gap pole arc rate in a range of 0.70±0.05, the extent of torque rippling can be reduced particularly effectively and furthermore, the effective utilization of the reluctance torque is enabled.

At a stator 230 adopting the concentrated winding method, the cogging torque can be reduced particularly effectively by setting the magnetic pole arc rate within a range of 0.66±0.05. In addition, by setting the gap pole arc rate in a range of 0.80±0.05, the extent of torque rippling can be reduced particularly effectively and furthermore, the effective utilization of the reluctance torque is enabled.

Figure 7:
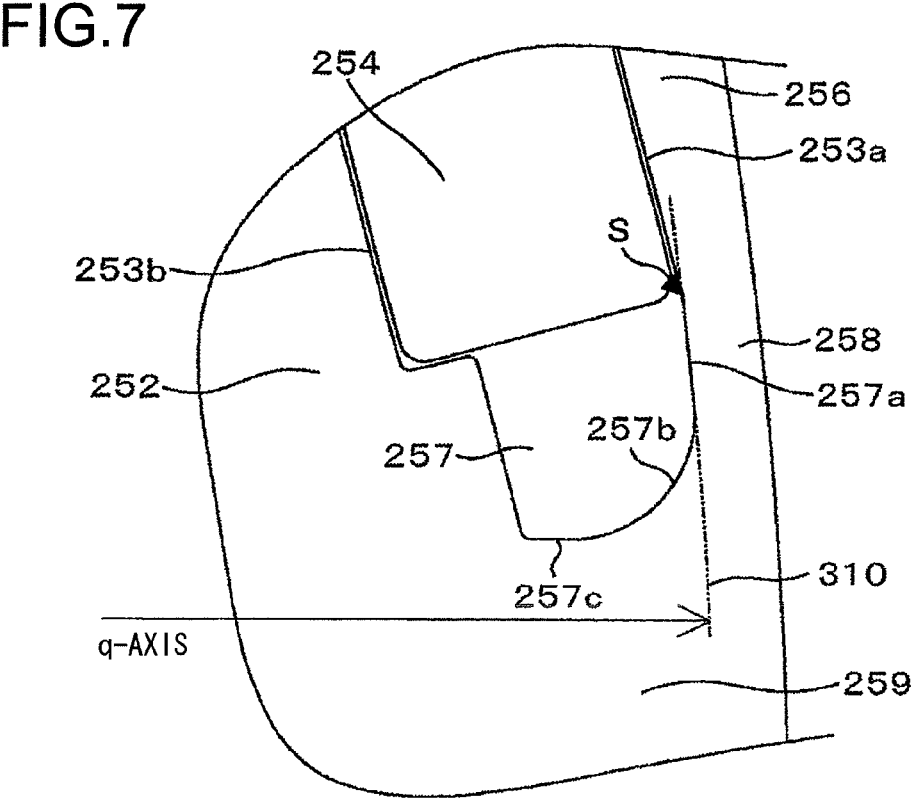

FIG. 7 is an enlarged view of an area B in FIG. 6. Movement of the permanent magnet 254 along the radius of the rotor 250 is restricted by a surface 253a of the magnet insertion hole 253 on the outer circumferential side and a surface 253b of the magnet insertion hole 253 on the inner circumferential side, and thus, better ease of assembly is assured without having to use an additional component. In addition, the core portion 256 assumes the smallest thickness along the radial direction at a surface 257a defining the bridge portion 258 on the inner circumferential side of the rotor 250. The side of the magnetic gap 257, located further toward the stator 230, includes a first side, which initially extends from the side where the permanent magnet 254 is present toward the auxiliary salient pole portion 259 along a virtual circular arc 310 centered on the rotational axis of the rotor 250 and passing through a side of the permanent magnet insertion hole 253 closest to the stator 230, and then extends by gradually increasing the distance from the virtual circular arc 310. In other words, the surface 257a defining the bridge portion 258 on the inner circumferential side of the rotor 250 assumes a non-projecting circular form concentric to the virtual circular arc 310 centered on the rotational axis of the rotor 250 and passing through a point S where the surface 253a and the surface 257a intersect each other.

In addition, the side of the magnetic gap 257 toward the auxiliary salient pole portion 259 includes a second side (a surface 257c defining the magnetic gap 257 on the side closer to the auxiliary salient pole portion 259) that extends further away from the stator 230, and the first side described earlier and the second side are connected with a curved line. In other words, a surface 257b present at an end of the surface 257a forms an R shape with a radius smaller than that of the virtual circular arc 310.

The second side (the surface 257c of the magnetic gap 257 located toward the auxiliary salient pole portion 259) of the magnetic gap 257 has a contour that substantially matches the passage of the q-axis magnetic flux through the auxiliary salient pole.

The present invention is bound to prove particularly effective if the magnetic gap 257 is formed so that the ratio of the length of the curved line to the length of the first side is within a range of 0.5 to 2.

Figure 8:
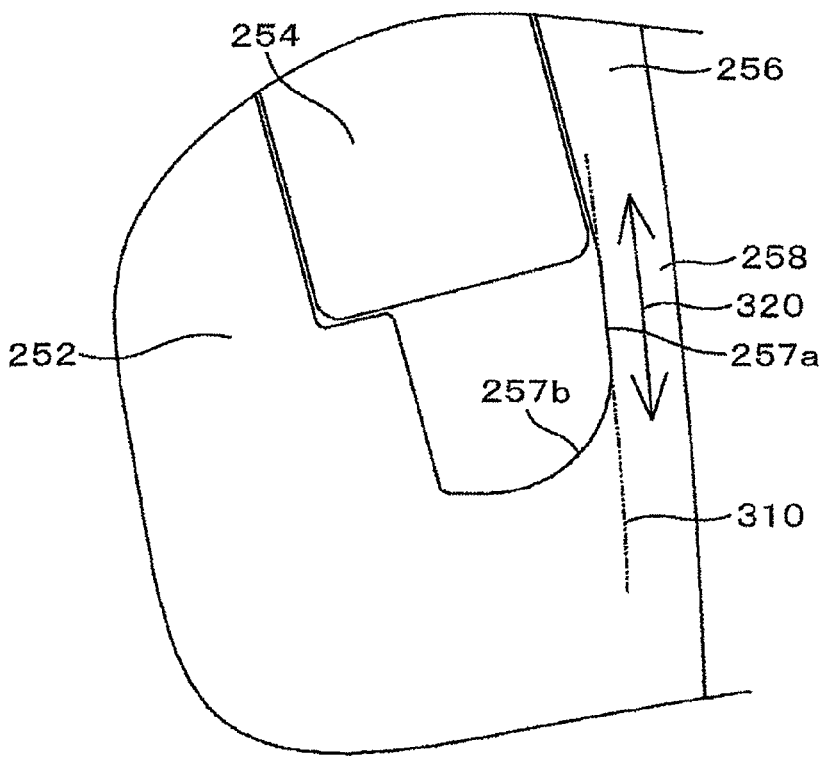

FIG. 8 indicates the direction along which a force generated at the bridge portion 258 as the rotor 250 rotates is imparted. As the rotor 250 rotates, centrifugal force is generated at the permanent magnet 254 and at the rotor core 252 and, as a result, tensile stress 320 is induced at the bridge portion 258. At this time, since the surface 257a ranges substantially parallel to the tensile stress 320 and the thickness of the bridge portion 258, measured along a direction perpendicular to the direction of the tensile stress 320 is substantially uniform, the extent to which stress occurring at the surface 257a concentrates can be kept down. In addition, the surface 257b located at each of the two ends of the surface 257a has a curved contour (machined to achieve an R shape) and, as a result, the stress can be further reduced. Although not shown, a third side forming a substantially straight line connecting the first side and the curved line may be formed at the surface defining the magnetic gap 257 located toward stator 230 so as to also reduce the stress.

Figure 9:
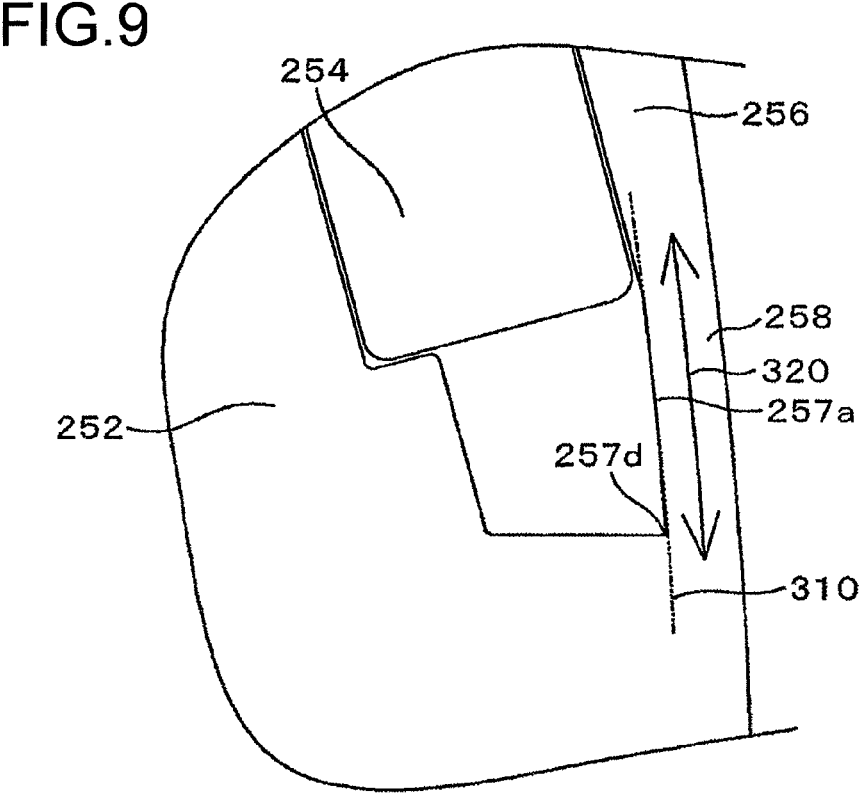

FIG. 9 indicates the direction in which the force, induced as the rotor 250 rotates, is imparted when a corner 257d, instead of the surface 257b, is formed in a comparable example. In this case, too, the surface 257a ranges substantially parallel to the tensile stress 320, and thus, the extent of concentration of stress occurring at the surface 257a can be kept down. However, since the thickness of the bridge portion 258, measured along the radial direction, changes drastically over the corner 257d, significant stress occurs at the corner 257d.

Figure 10:
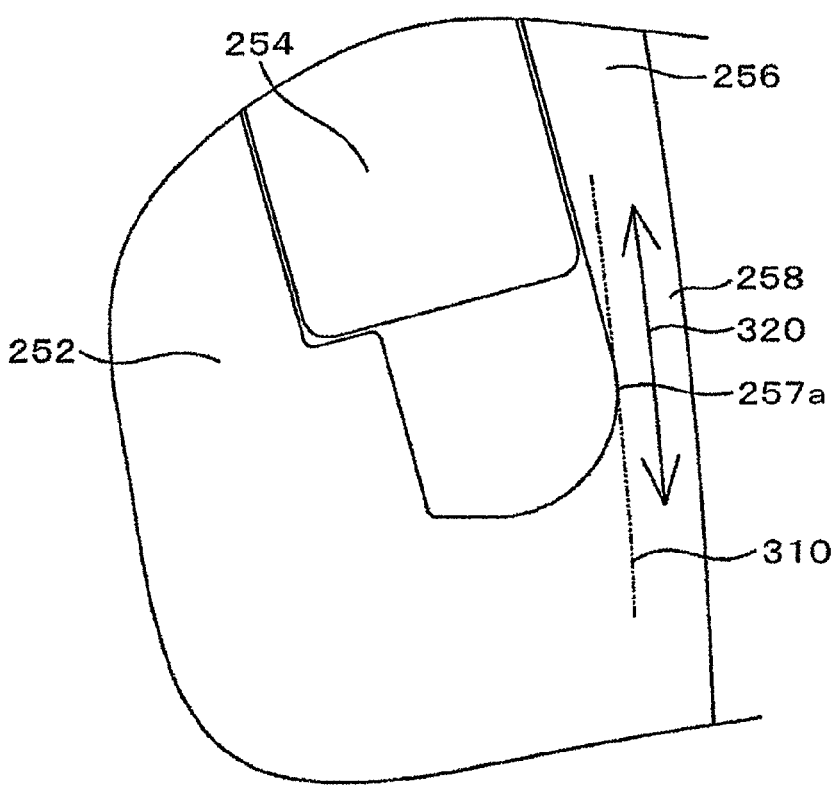

FIG. 10 shows the direction of the force, induced as the rotor 250 rotates, is imparted when the surface 257a projects out toward the virtual circular arc 310 in a comparable example. In this case, the bridge portion 258 assumes the smallest thickness along the radial direction at a single point and thus, the thickness of the bridge portion 258, measured along the direction perpendicular to the direction of the tensile stress 320 does not remain uniform, resulting in great stress occurring at the surface 257a.

Assuming that the smallest thickness measured at the bridge portion 258 along the radial direction in the rotating electric machine in the embodiment shown in FIG. 8 matches the smallest thickness measured at the bridge portion 258 along the radial direction in the rotating electric machine in the comparable example presented in FIG. 10, the permanent magnet 254 in the rotating electric machine in FIG. 8 can be disposed further toward the outer circumference. This means that the mass of the core portion 256 can be reduced and thus the centrifugal force occurring at the core portion 256 can also be reduced in the rotating electric machine shown in FIG. 8.

Figure 11:
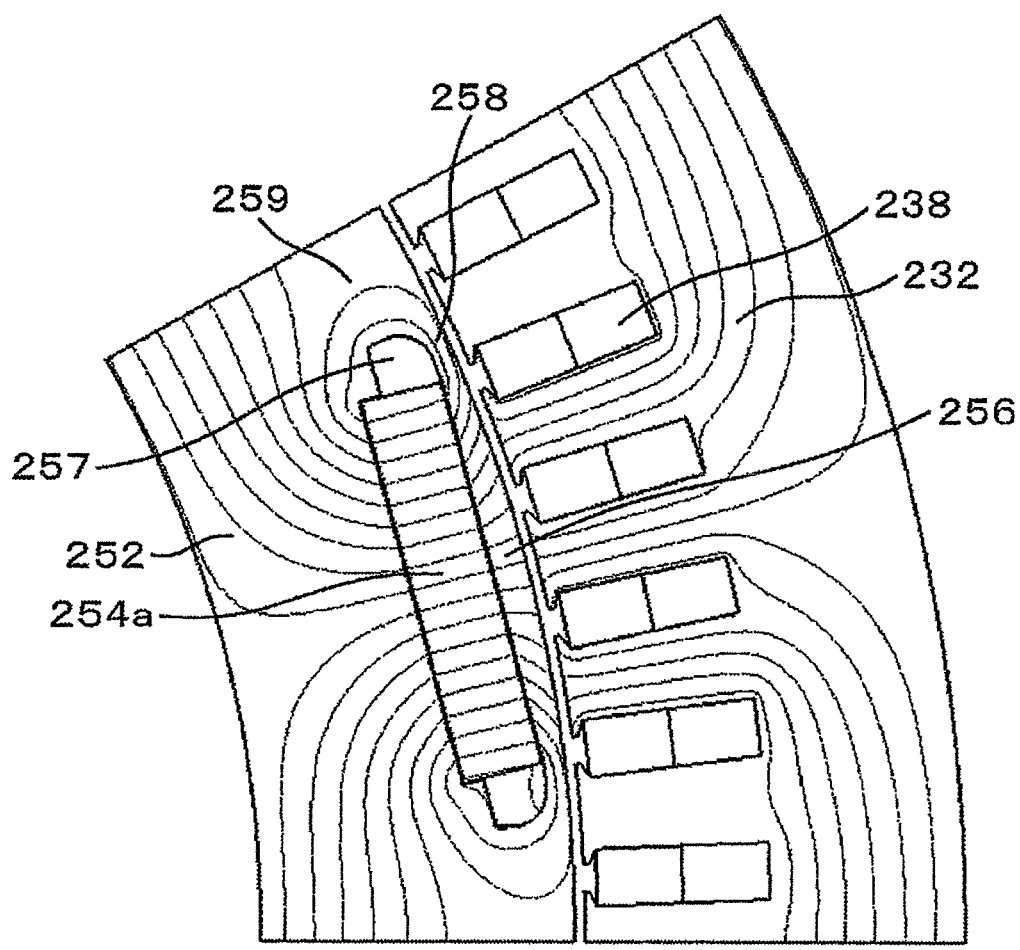

FIG. 11 shows a magnetic flux line distribution that may manifest when no electric power is supplied to the stator winding 238 in the rotating electric machine achieved in the embodiment configured with the stator 230 and the rotor 250 as described above. The magnetic fluxes originating from a permanent magnet 254 are divided into leaking magnetic fluxes which leak within the rotor core 252 and effective magnetic fluxes that pass through the stator core 232 and achieve inter-linkage with the stator winding 238. A magnetic torque is generated with the effective magnetic fluxes as power is supplied to the stator winding 238. The leaking magnetic fluxes, having departed the permanent magnet 254a through the outer circumferential side thereof pass through the bridge portions 258, travel through the auxiliary salient pole portions 259 and move to the inner circumferential side of the permanent magnet 254a or toward the outer circumferential side of the permanent magnets 254b each located at a next magnetic pole. While the leaking magnetic fluxes are not a contributing factor in magnetic torque generation, they cause saturation at the bridge portions 258 so as to direct the remaining magnetic fluxes toward the stator core 232 and allow them to be used as effective magnetic fluxes. In other words, in order to achieve a greater torque, the bridge portions 258 need to be saturated with a smaller amount of leaking magnetic fluxes and generate a greater amount of effective magnetic fluxes. In the embodiment, the stress induced as the rotor rotates can be reduced, which allows the bridge portions 258 to assume a smaller thickness compared to the related art. Thus, the leaking magnetic fluxes can be reduced by increasing the magnetic resistance at the bridge portions 258, which makes it possible to achieve both greater torque and higher rotation speed. Furthermore, since the core portion 256 achieves the smallest thickness along the radial direction over a continuous area instead of at a point, the magnetic resistance at the bridge portions 258 can be increased over that in the related art, thereby assuring a significant leaking magnetic flux reducing effect.

Figure 12:
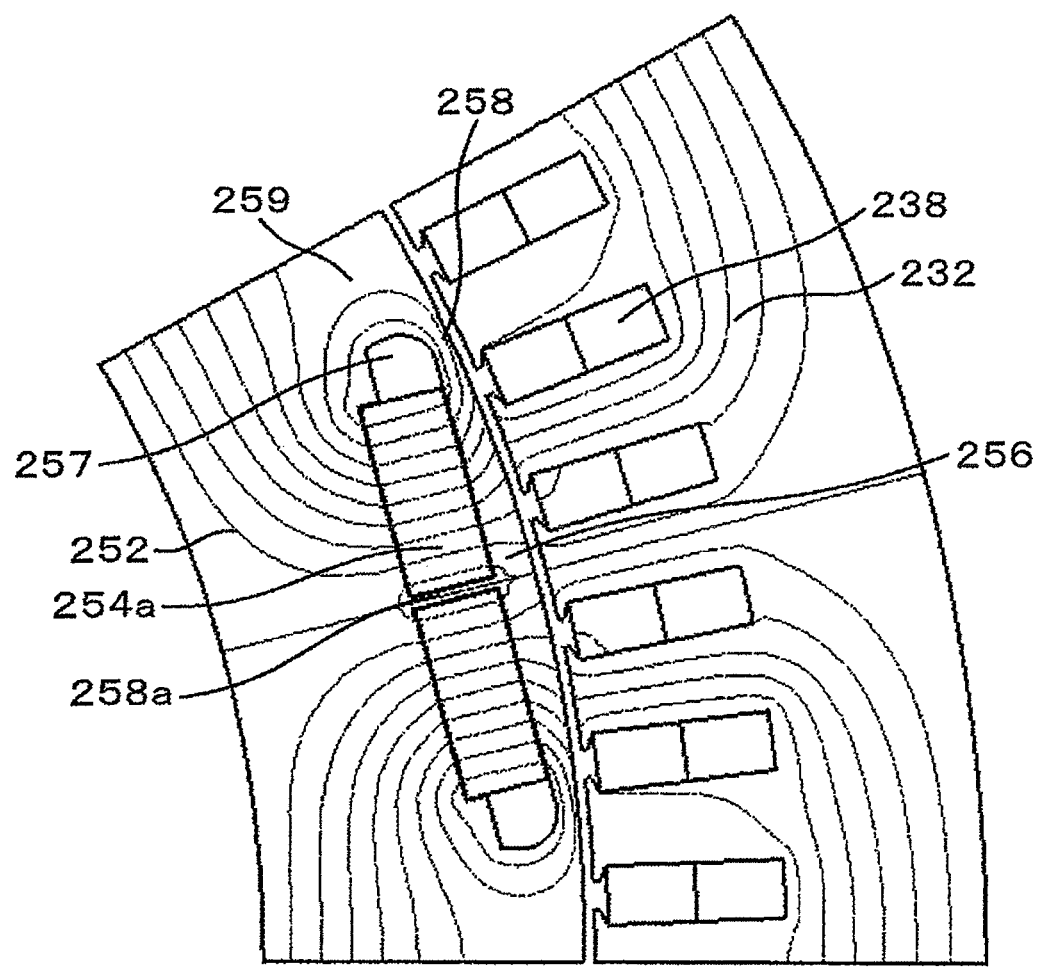

FIG. 12 shows a magnetic flux line distribution that may manifest over the stator 200 and the rotor 250 while no electric power is supplied to the stator winding 238 in a comparable example that includes a bridge portion 258a formed at the center of each magnetic pole. While this structure, with the bridge portion 258a supporting the centrifugal force occurring at the permanent magnet 254, allows the rotor to rotate at a higher rotation speed, the bridge portion 258a, as well as the bridge portions 258, form a leaking magnetic flux path, resulting in a reduction in the effective magnetic fluxes and thus making it more difficult to achieve greater torque.

Figure 13:
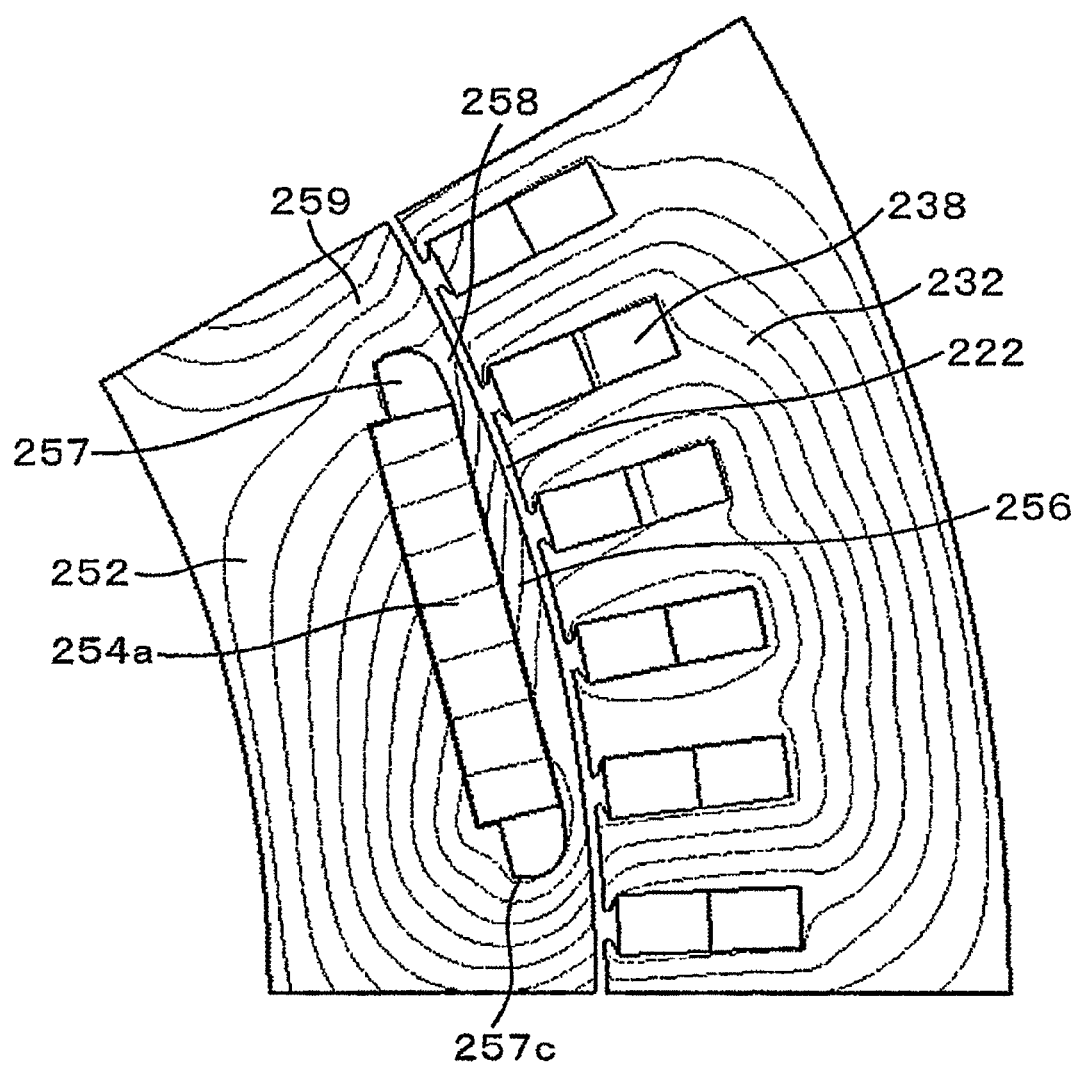

FIG. 13 shows a magnetic flux line distribution that may manifest over the stator 230 and the rotor 250 in the rotating electric machine achieved in the embodiment while electric power is supplied to the stator winding 238. As the surface 257c ranges substantially parallel to the q-axis, magnetic fluxes are allowed to pass through the q-axis with greater ease, thereby assuring an improvement in the generation of reluctance torque.

Figure 14:
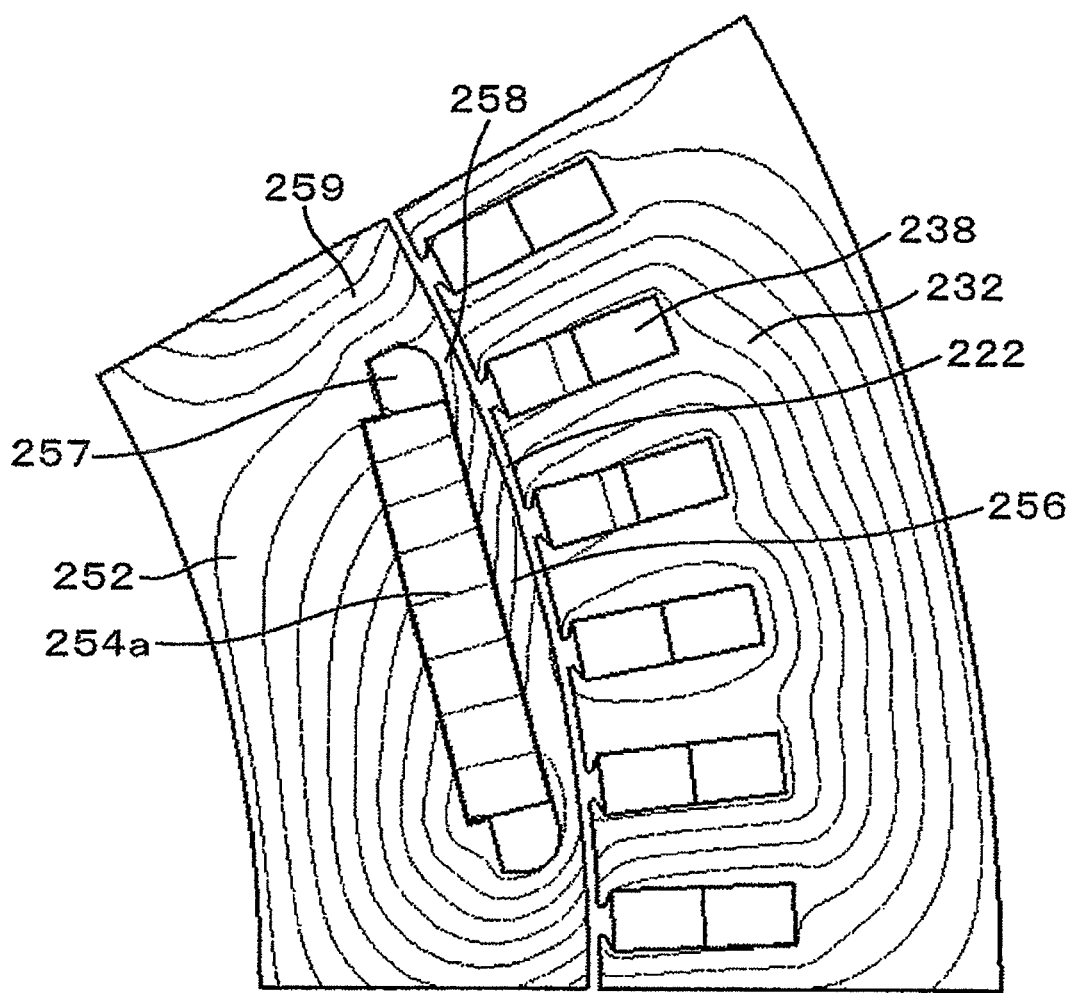

FIG. 14 shows a magnetic flux line distribution that may manifest over the stator 230 and the rotor 250 while electric power is supplied to the stator winding 238 in a rotating electric machine with the surface 257a projecting out relative to the virtual circular arc 310 in a comparable example.

Assuming that the smallest thickness measured at the bridge portion 258 along the radial direction in the rotating electric machine in the embodiment shown in FIG. 13 matches the smallest thickness measured at the bridge portion 258 along the radial direction in the rotating electric machine in the comparable example presented in FIG. 14, the permanent magnet 254 in the rotating electric machine in FIG. 13 can be disposed further toward the outer circumference. The flow of magnetic flux through the core portion 256 and the gaps 222 can be bent by a significant extent relative to the radius of the rotor 250 and thus, an improvement in the generation of magnetic torque is assured.

Figure 15:
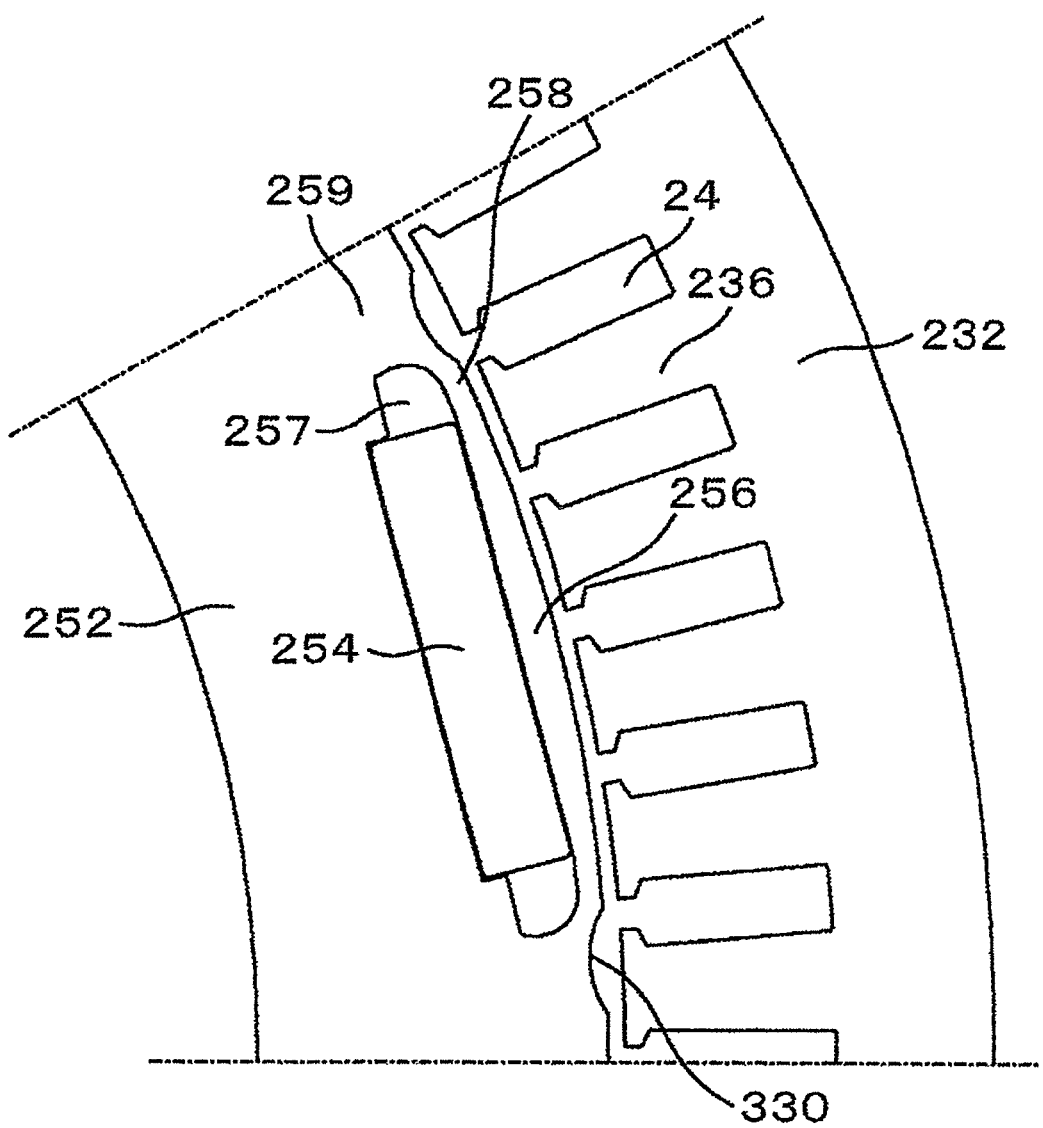

FIG. 15 shows another rotating electric machine achieved by adopting the present invention in an enlarged sectional view. By adopting the present invention in conjunction with grooves 330 formed at the auxiliary salient pole portions 259 on the outer circumferential side of the rotor core 252, too, advantages similar to those described earlier can be achieved, as long as the thickness measured between the grooves 330 and the magnetic gaps 257 is equal to or greater than the thickness of the bridge portions 258 measured over areas where the bridge portions 258 assume the smallest thickness along the radial direction.

Figure 16:
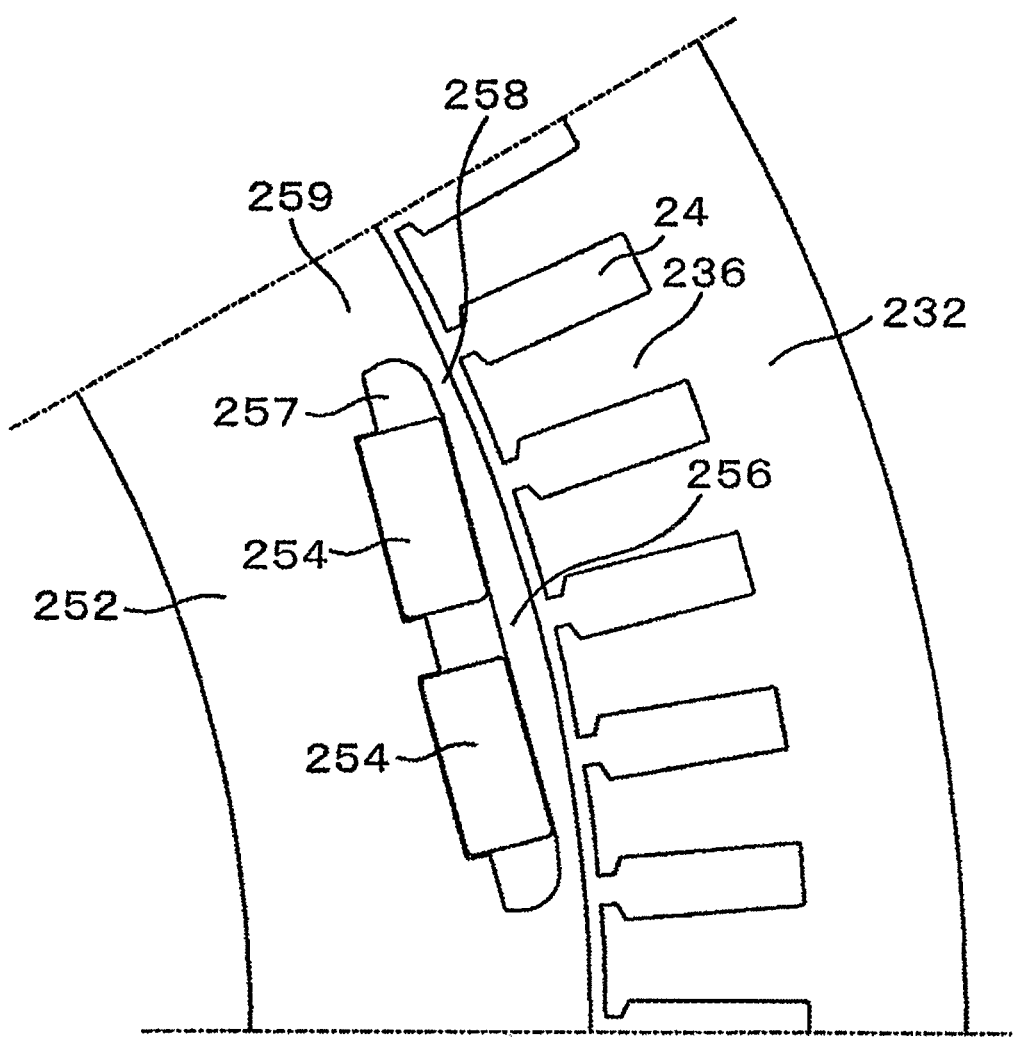

FIG. 16 shows another rotating electric machine achieved by adopting the present invention in an enlarged sectional view. By adopting the present invention in conjunction with a plurality of permanent magnets 254 disposed in correspondence to each pole, similar advantages can be achieved as long as there is no leaking magnetic flux path other than those over the bridge portions 258. The use of a plurality of permanent magnets 254, separate from one another, is bound to reduce the eddy current that flows at the surfaces of the permanent magnets 254, which, in turn, makes it possible to reduce the extent of heat generation and improve the efficiency.

Figure 17:
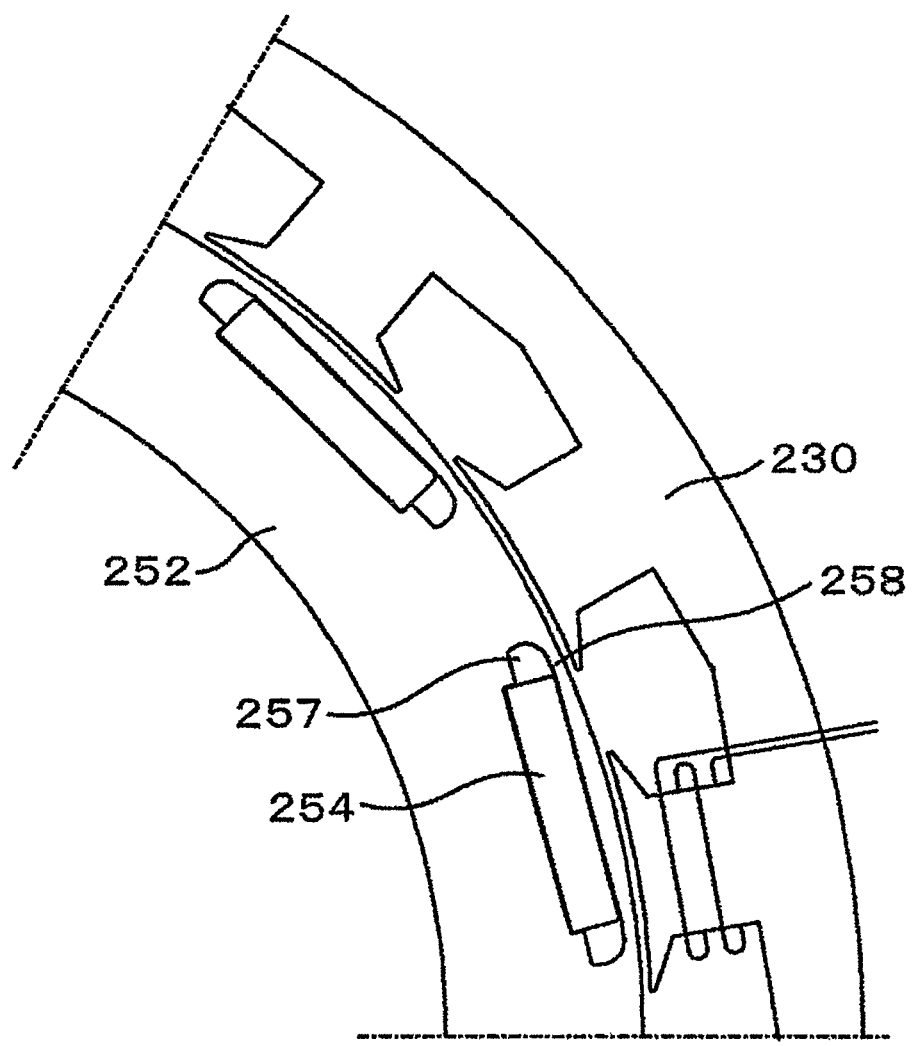

FIG. 17 shows another rotating electric machine achieved by adopting the present invention in an enlarged sectional view. Similar advantages can be achieved in conjunction with the stator 230 adopting the concentrated winding system. Namely, the present invention is not limited by the particulars of the stator winding.

While the present invention is adopted in motors used to drive vehicles in the description provided above, the present invention is not limited to this example and it may be adopted in any of various types of motors. Furthermore, it may be adopted in any of various types of rotating electric machines other than motors, such as generators. As long as the features characterizing the present invention are not compromised, the present invention is in no way limited to the particulars of the embodiments described above.

According to the present invention, the extent of concentration of stress attributable to centrifugal force can be reduced at the rotor core. In addition, since this enables effective utilization of magnetic fluxes from the permanent magnets while withstanding the rigors of high-speed rotation and also enables effective utilization of the reluctance torque, a permanent magnet rotating electric machine, assuring both greater torque and higher rotation speed and thus ideal for use in vehicle drive applications, can be provided at lower cost.

The disclosure of the following priority application is herein incorporated by reference:

Japanese Patent Application No. 2009-254539 filed Nov. 6, 2009.

The invention claimed is:

1. A rotating electric machine, comprising:
a stator that includes a stator core and a stator winding wound at the stator core; and
a rotor that is rotatably supported so as to rotate freely relative to the stator and includes a rotor core, with a plurality of magnetic poles formed at the rotor core and auxiliary salient poles formed for reluctance torque generation each between two successive magnetic poles set next to each other, wherein:
each of the magnetic poles of the rotor comprises a magnet insertion hole formed at the rotor core, a permanent magnet that is inserted in the magnet insertion hole, and a nonmagnetic portion formed between the permanent magnet and an auxiliary salient pole;
the permanent magnet is magnetized so as to achieve one polarity of N polarity and S polarity on a stator side thereof and achieve the other polarity on the opposite side wherein a magnetizing direction is reversed at every magnetic pole formed along a circumferential direction of the rotor;
at the rotor, a portion of the rotor core present over an area located toward the stator relative to the permanent magnet functions as a magnetic pole piece and a portion of the rotor core present over an area located toward the stator relative to the nonmagnetic portion function as a bridge portion connecting the magnetic pole piece with the auxiliary salient pole;
a side of the nonmagnetic portion located toward the stator includes a first side at the bridge portion, extending from a side where the permanent magnet is present toward an auxiliary salient pole along a virtual circular arc centered on a rotational axis of the rotor and passing through the permanent magnet insertion hole at a position closest to the stator, and a side of the nonmagnetic portion located toward the auxiliary salient pole includes a second side extending further away from the stator, with the first side and the second side connected through a curved line; and
the first side has a non-projecting circular form concentric to the virtual circular arc centered on the rotational axis of the rotor and passing through a point where a surface of the magnet insertion hole on the outer circumferential side and the first side intersect each other.

2. A rotating electric machine according to claim 1, wherein:
the second side of the nonmagnetic portion extends substantially along a q-axis magnetic flux passing through the auxiliary salient pole.

3. A rotating electric machine according to claim 1, wherein:
a ratio of a length of the curved line to a length of the first side is within a range of 0.5 to 2.

4. A rotating electric machine according to claim 1, wherein:
the nonmagnetic portion includes a third side, located at a surface thereof toward the stator and formed between the first side and the curved line so as to connect the first side and the curved line with a substantially straight line.

5. A rotating electric machine according to claim 1, wherein:
a thickness of the nonmagnetic portions measured along a radial direction is smaller than a thickness of the magnet measured along the radial direction.

6. A rotating electric machine according to claim 1, wherein:
a plurality of magnets are inserted in the magnet insertion hole.

7. A rotating electric machine according to claim 6, wherein:
at least one nonmagnetic portion is formed between the plurality of magnets.

8. A rotating electric machine according to claim 1, wherein:
the stator winding is wound with a distributed winding method; and
a pole arc rate at the magnet is set within a range of 0.50±0.05 and a pole arc rate at the nonmagnetic portion is set within a range of 0.70±0.05.

9. A rotating electric machine according to claim 1, wherein:
the stator winding is wound with a concentrated winding method; and
a pole arc rate at the magnet is set within a range of 0.66±0.05 and a pole arc rate at the nonmagnetic portions is set within a range of 0.80±0.05.

10. An automobile, comprising:
a rotating electric machine according to claim 1;
a battery that provides DC power; and
a conversion device that converts the DC power from the battery to AC power and supplies the AC power to the rotating electric machine, wherein:
torque generated at the rotating electric machine is used as a drive force.

\* \* \* \* \*